(12) United States Patent
Takegami

(10) Patent No.: US 8,830,700 B2
(45) Date of Patent: Sep. 9, 2014

(54) DC-DC CONVERTER AND METHOD FOR CONTROLLING DC-DC CONVERTER

(71) Applicant: TDK Corporation, Tokyo (JP)

(72) Inventor: Eiji Takegami, Tokyo (JP)

(73) Assignee: TDK Corporation (JP)

( * ) Notice: Subject to any disclaimer, the term of this patent is extended or adjusted under 35 U.S.C. 154(b) by 101 days.

(21) Appl. No.: 13/678,715

(22) Filed: Nov. 16, 2012

(65) Prior Publication Data

US 2013/0077351 A1  Mar. 28, 2013

Related U.S. Application Data

(63) Continuation-in-part of application No. 13/159,011, filed on Jun. 13, 2011.

(30) Foreign Application Priority Data

Nov. 18, 2011  (JP) ................................ 2011-252897

(51) Int. Cl.
*H02M 3/335* (2006.01)
*H02J 7/00* (2006.01)

(52) U.S. Cl.
USPC ............................................. 363/16; 320/166

(58) Field of Classification Search
USPC ............................................. 363/16; 320/166
See application file for complete search history.

(56) References Cited

U.S. PATENT DOCUMENTS

| | | | |
|---|---|---|---|
| 5,798,633 A | 8/1998 | Larsen et al. | |
| 6,876,556 B2 * | 4/2005 | Zhu et al. | 363/17 |
| 7,450,401 B2 * | 11/2008 | Iida | 363/16 |
| 2002/0186576 A1 | 12/2002 | Kanouda et al. | |
| 2006/0132102 A1 * | 6/2006 | Harvey | 320/166 |
| 2008/0062724 A1 | 3/2008 | Feng et al. | |
| 2008/0219032 A1 | 9/2008 | Stancu et al. | |
| 2008/0284387 A1 * | 11/2008 | Chen et al. | 323/222 |
| 2009/0108677 A1 | 4/2009 | Walter et al. | |

(Continued)

FOREIGN PATENT DOCUMENTS

| | | |
|---|---|---|
| DE | 10 2008 011 307 A1 | 9/2008 |
| DE | 10 2012 111 063 A1 | 5/2013 |

(Continued)

OTHER PUBLICATIONS

Li et al., Analysis and Design of Improved Isolated Full-Bridge Bi-Directional DC-DC Converter, Jun. 2004, IEEE, 35th Annual IEEE PESC, 521-526.*

*Primary Examiner* — Jue Zhang

(74) *Attorney, Agent, or Firm* — Harness, Dickey & Pierce, P.L.C.

(57) ABSTRACT

A DC-DC converter is configured with a voltage-source power converter provided at a primary side of a transformer, a current-source power converter provided at a secondary side of the transformer, and a controller. The controller generates a first control input based on a voltage between input and output terminals of the voltage-source power converter, a second control input based on a voltage between input and output terminals of the current-source power converter, and a command value for PWM or PFM control based on the first and second control inputs and an input-output current flowing between one of the input and output terminals of the voltage-source power converter and the current-source power converter. Therefore, it is easy to switch between a powering state and a regenerating state in the DC-DC converter.

25 Claims, 5 Drawing Sheets

(56) References Cited

U.S. PATENT DOCUMENTS

| | | |
|---|---|---|
| 2010/0045102 A1 | 2/2010 | Kitanaka |
| 2011/0037319 A1 * | 2/2011 | Matsui et al. ............... 307/43 |
| 2011/0310637 A1 | 12/2011 | Takegami |

FOREIGN PATENT DOCUMENTS

| | | |
|---|---|---|
| DE | 10 2012 111 607 A1 | 7/2013 |
| JP | 06-245501 | 9/1994 |
| JP | 11-008910 | 1/1999 |
| JP | 2002-165448 | 6/2002 |
| JP | 2006-081263 | 3/2006 |
| JP | 2006-187147 A | 7/2006 |
| JP | 2008-035675 | 2/2008 |
| JP | 2008-035675 A | 2/2008 |
| JP | 2008-228487 A | 9/2008 |
| JP | 2011-055602 A | 3/2011 |
| JP | 2012-005266 | 1/2012 |
| JP | 2012-005266 A | 1/2012 |

* cited by examiner

DC-DC CONVERTER AND METHOD FOR CONTROLLING DC-DC CONVERTER

CROSS-REFERENCE TO RELATED APPLICATION

This application claims priority to Japanese Patent Application No. 2011-252897 filed Nov. 18, 2011 which is hereby expressly incorporated by reference herein in its entirety.

BACKGROUND

The present invention relates to a DC-DC converter. Specifically, the present invention relates to a bidirectional DC-DC converter.

Japanese Patent Publication No. 2008-35675 discloses a bidirectional DC-DC converter that can be used in the case of powering and regenerating an electric motor or in the case of discharging and charging a storage battery.

However, a conventional bidirectional DC-DC converter cannot easily switch from a powering state to a regenerating state or from the regenerating state to the powering state. In addition, because it is necessary to perform control in both powering and regenerating states, there is also a problem in that the control system is complicated.

Therefore, an object of the present invention is to provide a DC-DC converter that can easily switch from a powering state to a regenerating state or from the regenerating state to the powering state.

SUMMARY

To solve the above problems, a DC-DC converter according to a first aspect of the present invention includes a transformer, a voltage-source power converter that is provided at a primary side of the transformer, a first voltage detection circuit that detects a first voltage between first input and output terminals of the voltage-source power converter, a current-source power converter that is provided at a secondary side of the transformer, a second voltage detection circuit that detects a second voltage between second input and output terminals of the current-source power converter, a current detection circuit that detects an input-output current between the second input and output terminals of the current-source power converter, and a controller that controls the voltage-source power converter and the current-source power converter to transfer power between the primary side and the secondary side of the transformer. The controller includes a first control system (a first control unit) that generates a first control input for the input-output current based on the first voltage, a second control system (a second control unit) that generates a second control input for the input-output current based on the second voltage, and a third control system (a third control unit) that generates a command value based on the first and second control inputs and the input-output current. The voltage-source power converter and the current-source power converter are controlled based on the command value. The command value is for pulse width modulation (PWM) control of the voltage-source power converter and the current-source power converter or for pulse frequency modulation (PFM) control of the voltage-source power converter and the current-source power converter.

In the DC-DC converter according to the first aspect of the present invention, the current that is detected by the current detection circuit may be an input-output current of input and output terminals of the voltage-source power converter. Further, the first control input generated by the first control system can be limited within a first predetermined range. The second control input generated by the second control system can be limited within a second predetermined range.

A DC-DC converter according to a second aspect of the present invention includes a transformer, a voltage-source power converter that is provided at a primary side of the transformer, a first voltage detection circuit that detects a first voltage between first input and output terminals of the voltage-source power converter, a current-source power converter that is provided at a secondary side of the transformer, a second voltage detection circuit that detects a second voltage between second input and output terminals of the current-source power converter, a current detection circuit that detects an input-output current between the second input and output terminals of the current-source power converter, and a controller that controls the voltage-source power converter and the current-source power converter to transfer power between the primary side and the secondary side of the transformer. The controller includes a first control mode that controls a first current value of an output current outputting from the second input and output terminals of the current-source power converter so as to be brought close to a first target value, and a second control mode that controls a second current value of an input current flowing in the second input and output terminals of the current-source power converter so as to be brought close to a second target value. When power is transferred from the primary side to the secondary side of the transformer, a first power conversion is performed under the first control mode. When power is transferred from the secondary side to the primary side of the transformer, a second power conversion is performed under the second control mode.

A DC-DC converter according to a third aspect of the present invention includes a transformer, a voltage-source power converter that is provided at a primary side of the transformer, a first voltage detection circuit that detects a first voltage between first input and output terminals of the voltage-source power converter, a current detection circuit that detects an input-output current between the first input and output terminals of the voltage-source power converter, a current-source power converter that is provided at a secondary side of the transformer, a second voltage detection circuit that detects a second voltage between second input and output terminals of the current-source power converter, and a controller that controls the voltage-source power converter and the current-source power converter to transfer power between the primary side and the secondary side of the transformer. The controller includes a first control mode that controls a first current value of an output current outputting from the first input and output terminals of the voltage-source power converter so as to be brought close to a first target value, and a second control mode that controls a second current value of an input current flowing in the first input and output terminals of the voltage-source power converter so as to be brought close to a second target value. When power is transferred from the secondary side to the primary side of the transformer, a first power conversion is performed under the first control mode. When power is transferred from the primary side to the secondary side of the transformer, a second power conversion is performed under the second control mode.

In a method for controlling a DC-DC converter according to a fourth aspect of the present invention, the DC-DC converter includes a voltage-source power converter provided at a primary side of a transformer and a current-source power converter provided at a secondary side of the transformer so as to transfer power between the primary side and the secondary side of the transformer. The method includes: generating a first control input based on a first voltage between first input and output terminals of the voltage-source power converter; generating a second control input based on a second voltage between second input and output terminals of the current-source power converter; generating a command value based on the first and second control inputs and an input-output current between the second input and output terminals of the current-source power converter; and controlling the voltage-source power converter and the current-source power converter based on the command value. The first and second control inputs control the input-output current between the second input and output terminals of the current-source power converter.

In the method for controlling the DC-DC converter according to the fourth aspect of the present invention, the command value controls pulse width modulation (PWM) of the voltage-source power converter and the current-source power converter or pulse frequency modulation (PFM) of the voltage-source power converter and the current-source power converter.

In a method for controlling a DC-DC converter according to a fifth aspect of the present invention, the DC-DC converter includes a voltage-source power converter provided at a primary side of a transformer and a current-source power converter provided at a secondary side of the transformer so as to transfer power between the primary side and the secondary side of the transformer. The method includes: generating a first control input based on a first voltage between first input and output terminals of the voltage-source power converter; generating a second control input based on a second voltage between second input and output terminals of the current-source power converter; generating a command value based on the first and second control inputs and an input-output current between the first input and output terminals of the voltage-source power converter; and controlling the voltage-source power converter and the current-source power converter based on the command value. The first and second control inputs control the input-output current between the first input and output terminals of the voltage-source power converter.

In the method for controlling the DC-DC converter according to the fifth aspect of the present invention, the command value controls pulse width modulation (PWM) of the voltage-source power converter and the current-source power converter or pulse frequency modulation (PFM) control of the voltage-source power converter and the current-source power converter.

A DC-DC converter according to another aspect of the present invention includes: a transformer; a voltage-source power converter that is provided at a primary side of the transformer and that performs power conversion by controlling a first voltage applied to the primary side of the transformer; a current-source power converter that is provided at a secondary side of the transformer, that includes a switch and an inductor, and that performs the power conversion by controlling a first current flowing in the secondary side of the transformer; and a controller that controls the voltage-source power converter and the current-source power converter based on a first voltage value of a second voltage generated between first input and output terminals of the voltage-source power converter, a second voltage value of a third voltage generated between second input and output terminals of the current-source power converter, and a first current value of an input-output current flowing between one of the first input and output terminals of the voltage-source power converter and the second input and output terminals of the current-source power converter. When the switch of the current-source power converter is turned on, a flux of the transformer is canceled out inside a core. A period for charging energy to the inductor is included in a period of the switching operation.

In the DC-DC converter according to another aspect of the present invention, the controller includes a first control mode that controls a second current value of an output current outputting from either of the first input and output terminals of the voltage-source power converter or the second input and output terminals of the current-source power converter so as to be brought close to a first target value, and a second control mode that controls the first current value of the input-output current flowing in either of the first input and output terminals of the voltage-source power converter or the second input and output terminals of the current-source power converter so as to be brought close to a second target value. When power is transferred from the primary side to the secondary side of the transformer, the power conversion is performed by the first control mode. When power is transferred from the secondary side to the primary side of the transformer, the power conversion is performed by the second control mode.

In the DC-DC converter according to another aspect of the present invention, the current-source power converter includes the inductor connected to a center tap of a secondary winding of the transformer, a first switching element connected between an end of the secondary winding and a negative pole of the second input and output terminals of the current-source power converter, a second switching element connected between another end of the secondary winding and the negative pole.

In the DC-DC converter according to another aspect of the present invention, the controller includes a first control system that generates a first control input for the input-output current based on the second voltage, a second control system that generates a second control input for the input-output current based on the third voltage, and a third control system that generates a command value based on the first and second control inputs and the input-output current. The voltage-source power converter and the current-source power converter are controlled based on the command value. The first, second and third control systems may also be respectively referred to as first, second and third control units.

In the DC-DC converter according to another aspect of the present invention, the third control system generates the command value for pulse width modulation (PWM) control of the voltage-source power converter and the current-source power converter based on the first current value flowing in the current-source power converter.

In the DC-DC converter according to another aspect of the present invention, the third control system generates the command value for pulse frequency modulation (PFM) control of the voltage-source power converter and the current-source power converter based on the first current value flowing in the current-source power converter.

In the DC-DC converter according to another aspect of the present invention, the third control system generates the command value for pulse width modulation (PWM) control of the voltage-source power converter and the current-source power converter based on the first current value flowing in the voltage-source power converter.

In the DC-DC converter according to another aspect of the present invention, the third control system generates the command value for pulse frequency modulation (PFM) control of the voltage-source power converter and the current-source power converter based on the first current value flowing in the voltage-source power converter.

In the DC-DC converter according to another aspect of the present invention, the first control input is within a first predetermined range, and the second control input is within a second predetermined range.

In a method for controlling a DC-DC converter according to yet another aspect of the present invention, the DC-DC converter includes a voltage-source power converter provided at a primary side of a transformer and a current-source power converter provided at a secondary side of the transformer so as to transfer power between the primary side and the secondary side of the transformer. The method includes: generating a first control input based on a first voltage between first input and output terminals of the voltage-source power converter; generating a second control input based on a second voltage between second input and output terminals of the current-source power converter; generating a command value based on the first and second control inputs and a first current value of an input-output current flowing between one of the first input and output terminals of the voltage-source power converter and the second input and output terminals of the current-source power converter; and controlling switching operations of the voltage-source power converter and the current-source power converter based on the command value. The controlling changes the first current value of the input-output current.

As explained above, the present invention easy switching from a powering state to a regeneration state or from the regeneration state to the powering state.

DESCRIPTION OF EXEMPLARY EMBODIMENTS

As discussed below, a DC-DC converter according to an embodiment of the present invention is explained with reference to the drawings.

Figure 1:
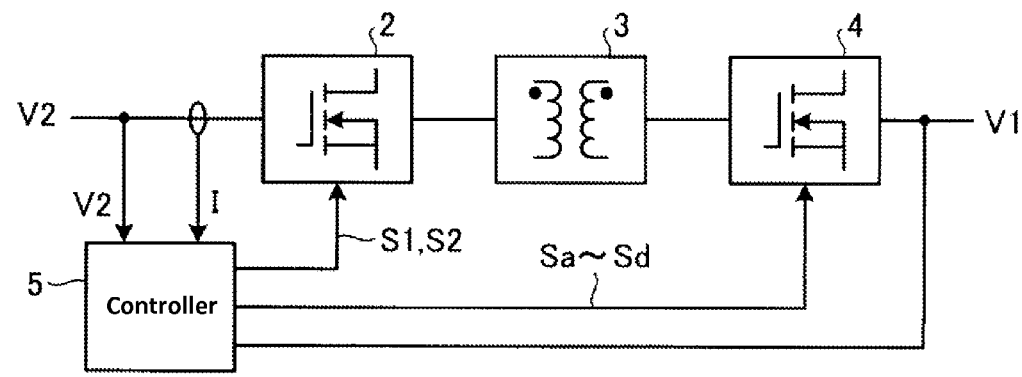
FIG. 1 is a block diagram of a DC-DC converter according to a first embodiment of the present invention.

FIG. 1 is a block diagram of a DC-DC converter according to a first embodiment of the present invention.

In FIG. 1, the DC-DC converter is configured with a transformer 3, a voltage-source power converter 4 that performs power conversion by controlling a voltage that is applied to a primary side of the transformer 3, a current-source power converter 2 that performs the power conversion by controlling an electric current that flows in a secondary side of the transformer 3, and a controller 5 that controls both the voltage-source power converter 4 and the current-source power converter 2.

When the power conversion is performed from the secondary side to the primary side of the transformer 3, a current, which is input to input and output terminals of the current-source power converter 2, is converted to an alternating current (AC) by the current-source power converter 2. The alternating current is supplied to the voltage-source power converter 4 through the transformer 3. Further, the alternating current, which is supplied to the voltage-source power converter 4 through the transformer 3, is converted to direct current (DC) by the voltage-source power converter 4. The direct current is output from input and output terminals of the voltage-source power converter 4.

When the power conversion is performed from the primary side to the secondary side of the transformer 3, a direct current, which is input from the input and output terminals of the voltage-source power converter 4, is converted to an alternating current by the voltage-source power converter 4. The alternating current is supplied to the current-source power converter 2 through the transformer 3. Further, the alternating current, which is supplied to the current-source power converter 2 through the transformer 3, is converted to direct current by the current-source power converter 2. The direct current is output from the input and output terminals of the current-source power converter 2.

A voltage between the input and output terminals of the current-source power converter 2 is a voltage V2. A voltage between the input and output terminals of the voltage-source power converter 4 is a voltage V1. An electric current, which is output from the input and output terminals of the current-source power converter 2, is a current I. A value of the current I becomes a positive value when the electric current is output from the input and output terminals of the current-source power converter 2. The value of the current I becomes a negative value when the electric current flows into the input and output terminals of the current-source power converter 2. The controller 5 controls the increase and the decrease of the current I with reference to the voltage V1, the voltage V2 and the current I.

When the power conversion is performed from the primary side to the secondary side of the transformer 3, the controller 5 controls the increase and the decrease of the current (I), which is output from the input and output terminals of the current-source power converter 2, with reference to the voltage V1, the voltage V2 and the current I. For instance, when it is desired to increase the voltage V2 or to decrease the voltage V1, the current-source power converter 2 and voltage-source power converter 4 are controlled so as to increase the current (I), which is output from the input and output terminals of the current-source power converter 2. Similarly, when it is desired to decrease the voltage V2 or to increase the voltage V1, the current-source power converter 2 and the voltage-source power converter 4 are controlled so as to decrease the current (I), which is output from the input and output terminals of the current-source power converter 2. On the other hand, when the power conversion is performed from the secondary side to the primary side of the transformer 3, the controller 5 controls the increase and the decrease of the current (−I) which flows into the input and output terminals of the current-source power converter 2 with reference to the voltage V1, the voltage V2 and the current I. For instance, when it is desired to increase the voltage V1, the current-source power converter 2 and the voltage-source power converter 4 are controlled so as to increase the current (−I), which flows into the input and output terminals of the current-source power converter 2 (this means that the absolute value of the current I, which is the negative value, is larger). Similarly, when it is desired to decrease the voltage V1, the current-source power converter 2 and the voltage-source power converter 4 are controlled so as to decrease the current (−I), which flows into the input and output terminals of the current-source power converter 2 (this means that the absolute value of current I, which is the negative value, is smaller).

Figure 2:
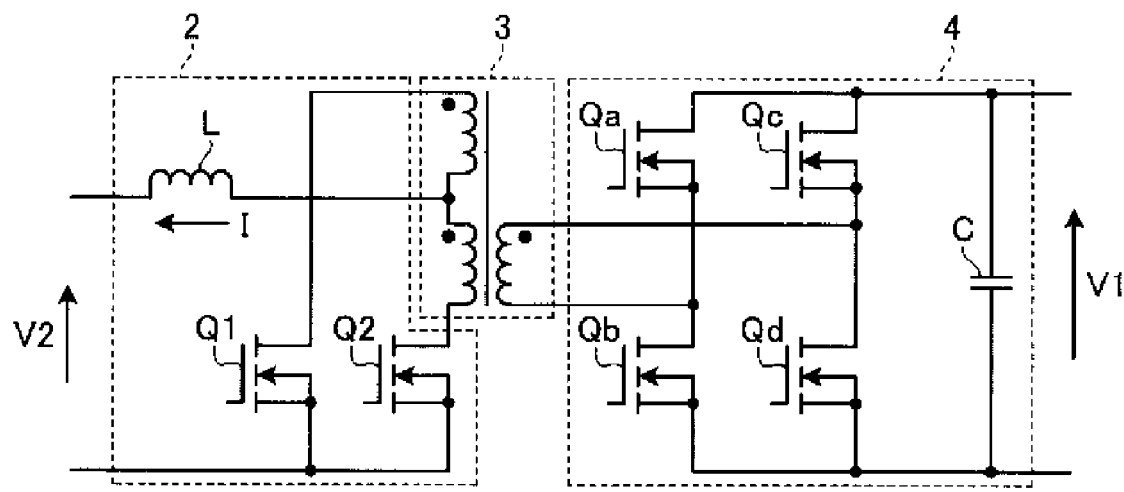
FIG. 2 is a circuit diagram of a current-source power converter 2, a transformer 3 and a voltage-source power converter 4 shown in FIG. 1.

FIG. 2 is a circuit diagram that shows a basic configuration of the current-source power converter 2, the transformer 3 and the voltage-source power converter 4 shown in FIG. 1. In the embodiment shown in FIG. 2, a push-pull configuration is employed as the current-source power converter 2 and a full bridge configuration is employed as the voltage-source power converter 4.

The current-source power converter 2 is configured with switching elements Q1, Q2 and an inductor L as main components. The switching element Q1 is connected between one end of a secondary winding of the transformer 3 and a negative terminal. The switching element Q2 is connected between another end of the secondary winding of the transformer 3 and the negative terminal. Further, the inductor L is connected between a center tap of the secondary winding of the transformer 3 and a positive terminal.

The input and output terminals of the current-source power converter 2 are configured with the positive terminal and the negative terminal. A voltage between the positive terminal and the negative terminal corresponds to the voltage V2.

The voltage-source power converter 4 is configured with switching elements Qa-Qd and a smoothing capacitor C as main components. The switching elements Qa, Qb are connected to each other in series and the switching elements Qc, Qd are connected to each other in series. A series circuit of the switching elements Qa, Qb and a series circuit of the switching elements Qc, Qd are connected to each other in parallel. A primary winding of the transformer 3 is connected between a node connecting the switching elements Qa, Qb and a node connecting the switching elements Qc, Qd. Further, the series circuit of the switching elements Qa, Qb, the series circuit of the switching elements Qc, Qd and the smoothing capacitor C are connected between a positive terminal and a negative terminal. The input and output terminals of the voltage-source power converter 4 are configured with the positive terminal and the negative terminal. The voltage between the positive terminal and the negative terminal corresponds to the voltage V1.

A field effect transistor, a bipolar transistor or an IGBT can be used for the switching elements Q1, Q2 and Qa-Qd. A body diode can also be formed in the switching elements Q1, Q2 and Qa-Qd.

Figure 3:
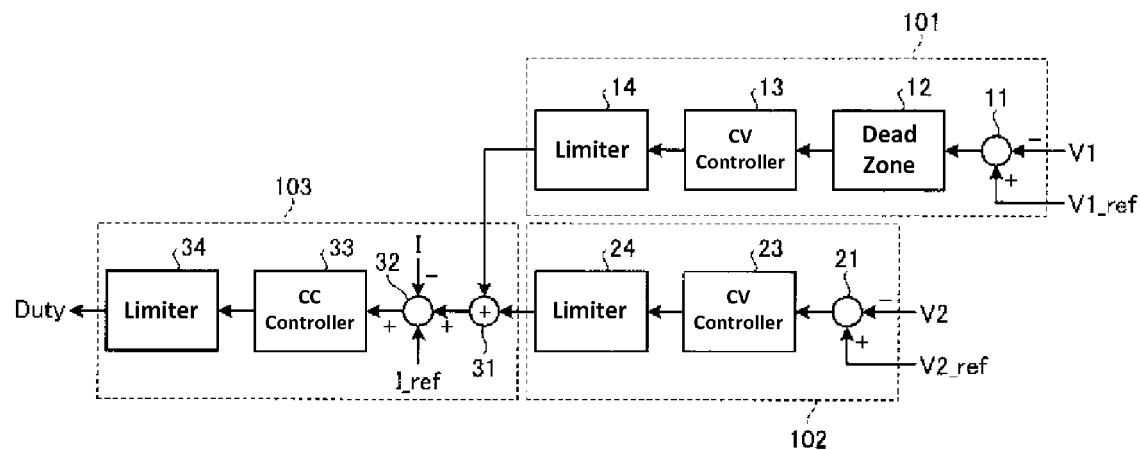
FIG. 3 is a block diagram of a controller 5 shown in FIG. 1.

FIG. 3 is a block diagram that shows a basic configuration of the controller 5 shown in FIG. 1.

In FIG. 3, the controller 5 is configured with a first voltage control system 101, a second voltage control system 102 and a current control system 103. The current control system 103 is located on a latter part of the first voltage control system 101 and the second voltage control system 102 (i.e., the current control system 103 is downstream of the others). Therefore, an output value that is output from the first voltage control system 101 and an output value that is output from the second voltage control system 102 are input to the current control system 103.

In the first voltage control system 101, a dead zone 12 (a dead zone circuit) is provided at the latter part of a subtracter 11. A CV controller 13 is provided at the latter part of the dead zone 12. A limiter 14 is provided at the latter part of the CV controller 13. The CV controller 13 compares the voltage V1 with V1_ref that is a target value of the voltage V1. Then, the CV controller 13 generates a control input of the current I based on the compared result and outputs the control input. The dead zone 12 can configure an acceptable range for change of the voltage V1. Thus, the dead zone 12 is provided so that the CV controller 13 does not operate as long as the change of the voltage V1 is within the acceptable range. The limiter 14 is provided in order to limit the range of the control input that is output from the CV controller 13. In the case in which the control input, which is output from the CV controller 13, is within the range that is configured by the limiter 14, the control input, which is output from the CV controller 13, is output as it is from the first voltage control system 101. On the other hand, in the case in which the control input, which is output from the CV controller 13, is out of the range that is configured by the limiter 14, a lower limit or an upper limit, which is configured by the limiter 14, is output from the first voltage control system 101 instead.

In the second voltage control system 102, a CV controller 23 is provided at the latter part of a subtracter 21. A limiter 24 is provided at the latter part of the CV controller 23. The CV controller 23 compares the voltage V2 with V2_ref that is a target value of the voltage V2. The CV controller 23 generates a control input of the current I based on the compared result and outputs the control input. The limiter 24 is provided in order to limit the range of the control input that is output from the CV controller 23. In the case in which the control input, which is output from the CV controller 23, is within the range that is configured by the limiter 24, the control input, which is output from the CV controller 23, is output as it is from the second voltage control system 102. On the other hand, in the case in which the control input, which is output from the CV controller 23, is out of the range that is configured by the limiter 24, a lower limit or an upper limit, which is configured by the limiter 24, is output from the second voltage control system 102.

In the current control system 103, an adder-subtracter 32 is provided at the latter part of an adder 31 and a CC controller 33 is provided at the latter part of the adder-subtracter 32. In addition, a limiter 34 is provided at the latter part of the CC controller 33. The CC controller 33 compares a value, which is the sum of the control input that is output from the first voltage control system 101 and the control input that is output from the second voltage control system 102, with the current I. Further, the CC controller 33 generates a command value of a duty ratio for Pulse Width Modulation (PWM) control based on the compared result and outputs the command value. The limiter 34 is provided in order to limit the range of the command value that is output from the CC controller 33. In the case in which the command value, which is output from the CC controller 33, is within the range that is configured by the limiter 24, the command value, which is output from the CC controller 33, is output as it is from the current control system 103. On the other hand, in the case in which the command value, which is output from the CC controller 33, is out of the range that is configured by the limiter 34, a lower limit or an upper limit, which is configured by the limiter 34, is output from the current control system 103. In the case of Pulse Frequency Modulation (PFM) control, the CC controller 33 generates the command value of a frequency for the PFM control. In addition, a value of a control parameter for the CC controller 33 can be configured in common for both power conversion from the primary side to the secondary side of the transformer 3 and for power conversion from the secondary side to the primary side of the transformer 3.

For power conversion from the primary side to the secondary side of the transformer 3, the values of the limiters 14, 24, 34 are configured as follows:
Limiter 14: the lower limit=−ΔI, the upper limit=ΔI;
Limiter 24: the lower limit=0, the upper limit=I_ref; and
Limiter 34: the lower limit=0, the upper limit=the greatest duty ratio.

Here, I_ref is a target value of the current I that is output from the input and output terminals of the current-source power converter 2. ΔI can be configured as a predetermined value. In the case in which the ranges of the limiters 14, 24, 34 are configured as explained above, the outputs of the first voltage control system 101, the second voltage control system 102 and the current control system 103 are limited as follows. In the case in which the control input, which is output from the CV controller 13, is larger than ΔI, the control input, which is output from the first voltage control system 101, is ΔI. In the case in which the control input, which is output from the CV controller 13, is smaller than −ΔI, the control input, which is output from the first voltage control system 101, is −ΔI. In the case in which the control input, which is output from the CV controller 23, is larger than I_ref, the control input, which is output from the second voltage control system 102, is I_ref. In the case in which the control input, which is output from the CV controller 23, is smaller 0, the control input, which is output from the second voltage control system 102, is 0. In the case in which the command value, which is output from the CC controller 33, is larger than a value of the greatest duty ratio, the command value, which is output from the current control system 103, is the same as the value of the greatest duty ratio. In the case in which the command value, which is output from the CC controller 33, is smaller than 0, the command value, which is output from the current control system 103, is 0. Therefore, the greatest value, that is the sum of the control input that is output from the first voltage control system 101 and of the control input that is output from the second voltage control system 102, becomes I_ref+ΔI. The minimum value becomes −ΔI. As a result, the current I changes between I_ref+ΔI and −ΔI.

Further, for power conversion from the secondary side to the primary side of the transformer 3, the values of the limiters 14, 24, 34 are configured as follows:
Limiter 14: the lower limit=−I_ref, the upper limit=0;
Limiter 24: the lower limit=0, the upper limit=0; and
Limiter 34: the lower limit=0, the upper limit=the greatest duty ratio.

Here, for power conversion from the secondary side to the primary side of the transformer 3, the increase and the decrease of the current which flows into the input and output terminals of the current-source power converter 2 is controlled. A target value of the current I is a negative value.

In this embodiment, the control input, which is output from the first voltage control system 101, is limited to the range between −I_ref and 0. That is, the first control voltage system 101 outputs the control input that varies as follows. This control input corresponds to the current flowing into the current-source power converter 2 varies in the range between 0 to I_ref.

Further, because the lower limit and the upper limit of the limiter 24 are configured to 0, the control input, which is output from the second voltage control system 102, maintains as 0. Thus, the function of the second voltage control system 102 can be substantially stopped by the setting value of the limiter 24. Further, the current control system 103 compares the control value that is output from the first voltage control system 101 and the current I. Then, the current control system 103 generates the command value of the duty ratio based on the compared result.

Operations in which the limiters 14, 24, 34 are established as discussed above are explained. First of all, the power conversion from the secondary side to the primary side of the transformer 3 is explained. For power conversion from the secondary side to the primary side of the transformer 3, the acceptable range of change of the dead zone 12 is configured to 0. The subtracter 11 outputs a value that is calculated by subtracting the voltage V1, which is a detected voltage at the input and output terminals of the voltage-source power converter 4, from the target value V1_ref. Then, the subtracted value is input to the CV controller 13 through the dead zone 12. The CV controller 13 generates a control input in which the subtracted value appears to approach 0 (the control input in which the voltage V1 approaches the target value V1_ref). After this control input is limited to the range between −I_ref and 0 at the limiter 14, the control input is output from the first voltage control system 101. Then, the control input is output to the adder-subtracter 32 through the adder 31.

The control input, which is output from the first voltage control system 101, is input to the adder-subtracter 32 through the adder 31. The adder-subtracter 32 adds an output value of the adder 31 and I-ref that is a target value of a charged current. Then, the adder-subtracter 32 subtracts the detection value of the current I from the added value. The calculated value is input to the CC controller 33. The CC controller 33 generates the command value the control input in which the calculated value approaches 0. After the limiter 34 limits the command value to the range between 0 to the greatest duty ratio, the limiter 34 outputs a duty ratio as a duty command Duty.

Next, the power conversion from the primary side to the secondary side of the transformer 3 is explained. For power conversion from the primary side to secondary side of the transformer 3, the control inputs are output from both the first voltage control system 101 and the second voltage control system 102 according to the configuration of the limiters 14, 24. The control input, which is output from the first voltage control system 101, is configured so as to be either positive or negative values.

The acceptable range of change of the dead zone 12 of the first voltage control system 101 is configured to the any value over 0. The subtracter 11 subtracts the voltage V1 from the target value V1_ref. The subtracted value is input to the CV controller 13 through the dead zone 12.

The CV controller 13 generates the control input in which the input subtracted value appears to approach 0 (the control input in which the detection value of the voltage V1 approaches the target value V1_ref of the rail voltage). The limiter 14 limits the control input to be in the range between −ΔI and ΔI. The control input, which is output from the limiter 14, is input to the adder 31.

The subtracter 21 subtracts the voltage V2, which is a detection voltage of the input and output terminals of the current-source power converter 2, from the target value V2_ref. The subtracted value is input to the CV controller 23.

The CV controller 23 generates the control input in which the input subtracted value appears to approach 0 (the control input in which the voltage V2 approaches the target value V2_ref). The limiter 24 limits the control input to be in the range between 0 and I_ref. The control input, which is output from the limiter 14, is input to the adder 31.

The adder 31 adds the output values from the limiters 14 and 24. The added value is input to the adder-subtracter 32. The adder-subtracter 32 adds the output value of the adder 31 and the target value I_ref. Then, adder-subtracter 32 subtracts the current I, that is the detection value of the electric current which is output from the input and output terminals of the current-source power converter 2, from the added value. The calculated value is input to the CC controller 33. The CC controller 33 generates the command value so as to make the output value of the adder-subtracter 32 approaches to 0. After the limiter 34 limits the command value to the range between 0 to the greatest duty ratio, the limiter 34 outputs a duty ratio as the duty command Duty.

Next, gate driving signals S1, S2, Sa-Sd that are generated based on the duty command Duty are explained. The switching elements Q1, Q2 shown in FIG. 2 are driven by the gate driving signals S1, S2. The switching elements Qa-Qd shown in FIG. 2 are driven by the gate driving signals Sa-Sd.

Figure 4:
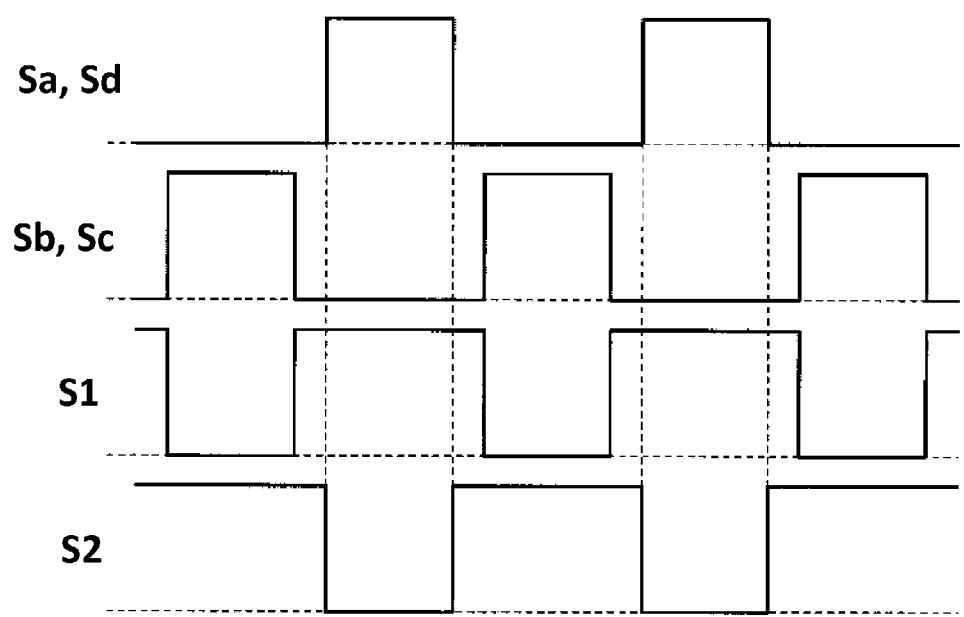
FIG. 4 is a timing diagram that shows waveforms of gate driving signals S1, S2, Sa-Sd shown in FIG. 1.

FIG. 4 is a timing diagram that shows the waveforms of the gate driving signals S1, S2, Sa-Sd shown in FIG. 1. The duty ratios of the gate driving signals Sa-Sd are configured based on the duty command Duty. Further, the duty ratios of the gate driving signals Sa-Sd are configured so as to be the same one another. Phases of the gate driving signals Sa, Sd and phases of the gate driving signal Sb, Sc are different from each other by only a half cycle.

The gate driving signal S1 is generated by inverting the gate driving signals Sb, Sc. The gate driving signal S2 is generated by inverting the gate driving signals Sa, Sd. Thus, all of the gate driving signals S1, S2, Sa-Sd can be generated based on the duty command Duty.

For power conversion from the primary side to the secondary side of the transformer 3, the second voltage control system 102 shown in FIG. 3 performs to increase the voltage V2 when the voltage V2 decreases. Similarly, the first voltage control system 101 performs to increase the voltage V1 when the voltage V1 decreases. The operations of the first voltage control system 101 and the second voltage control system 102 are performed in parallel.

Thus, as the operations of first voltage control system 101 and the second voltage control system 102 are performed in parallel, the change of the voltage V1 can be controlled when the power conversion is performed from the primary side to the secondary side of the transformer 3. For instance, when the voltage V2 decreases due to the decrease of the voltage V1, it is possible to increase the voltage V1 while the increase of the voltage V2 is prevented.

Figure 10:
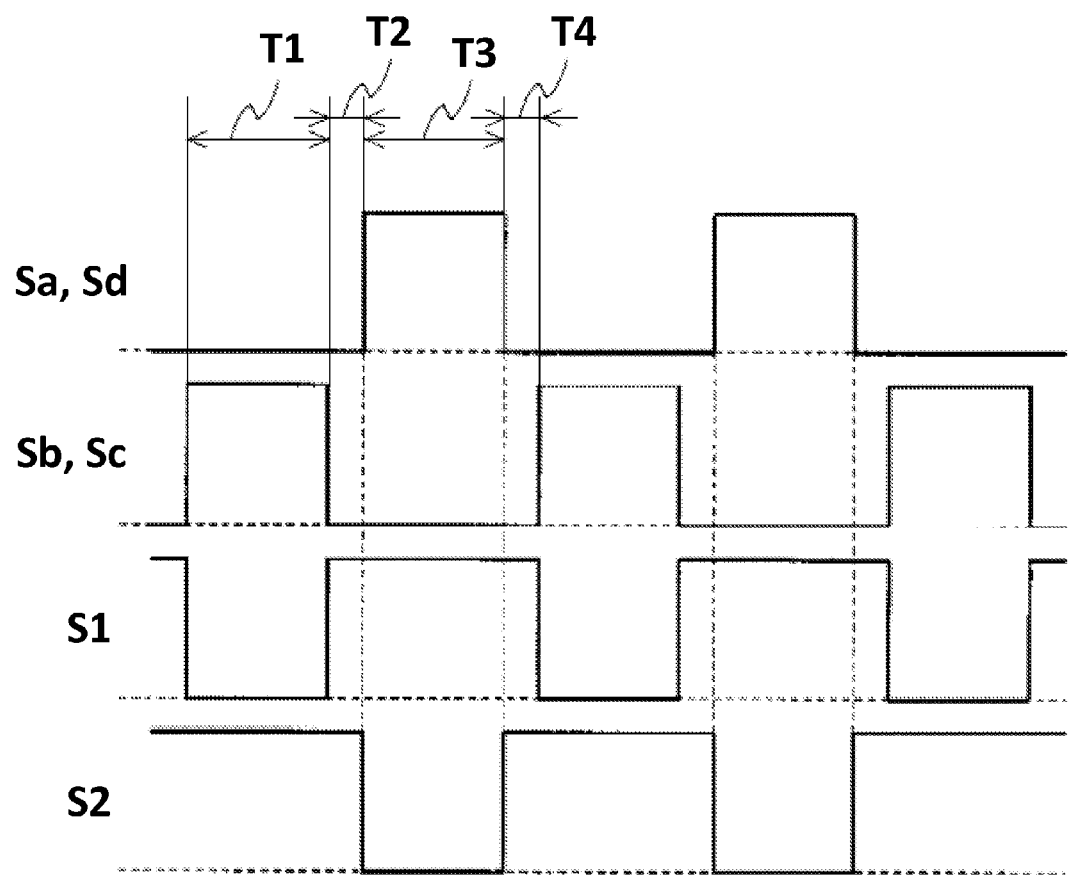
FIG. 10 is a timing diagram showing periods from T1 to T4 on the timing chart that shows waveforms of the gate driving signals S1, S2, Sa-Sd shown in FIG. 4.

A method for controlling a current value is explained in detail based on FIG. 2 and FIG. 10. FIG. 10 is a timing diagram showing periods from T1 to T4 on the timing chart that shows waveforms of the gate driving signals S1, S2, Sa-Sd shown in FIG. 4.

It is explained about the case in which both the switching elements Q1, Q2 turn ON. During the periods of T2, T4 in FIG. 10, the switching elements Q1, Q2 turn ON. When the switching elements Q1, Q2 turn ON, the switching elements Qa-Qd turn OFF. Therefore, both ends of the primary winding of the transformer 3 keep open. That is, the voltage V1 is not applied to both ends of the primary winding of the transformer 3.

On the other hand, by turning ON the switching elements Q1, Q2, an electric current that flows from the center tap of the secondary winding of the transformer 3 to the switching element Q1 and an electric current that flows from the center tap of the secondary winding of the transformer 3 to the switching element Q2 flow to the two secondary windings. At this time, a voltage is not generated at the secondary side of the transformer 3 because both ends of the secondary winding of the transformer 3 become short.

Therefore, the relationship of the input voltage V2 and the current I are defined as formula 1 (a direction of the arrow shown in FIG. 2 is positive). Here, the inductance of the inductor L is L in the formula.

$$V2 + L \times dI/dt = 0 \qquad \text{(Formula 1)}$$

An electric current during this period changes according to a change ratio (dI/dt) that satisfies formula 1. Therefore, during this period, as long as the electric current flows in the direction as indicated by the arrow shown in FIG. 2, the electric current decreases by the change ratio (dI/dt) that satisfies formula 1. On the other hand, as long as the electric current flows in a direction opposite to the arrow shown in FIG. 2, the electric current increases by the change ratio (dI/dt) that satisfies formula 1.

Next, it is explained about the case in which only one of either the switching elements Q1 or Q2 turns ON. During the period of T1 shown in FIG. 10, the switching elements Q2, Qb and Qc turn ON. During the period of T3 shown in FIG. 10, the switching elements Q1, Qa and Qd turn ON. When the switching elements Qb, Qc turn ON or when the switching elements Qa, Qd turn ON, the voltage V1 is applied to both ends of the primary winding of the transformer 3.

However, an electric pole of the applied voltage V1 in the case in which the switching element Qb, Qc turn ON and an electric pole of the applied voltage V1 in the case in which the switching element Qa, Qd turn ON are opposite to each other. When the winding number ratios of the primary side and the secondary side of the transformer 3 are n1:n2, a voltage generated at the secondary side of the transformer 3 during the periods of T1, T3 becomes V1×(n2/n1). Therefore, during the periods of T1, T3, formula 2 below is satisfied.

$$V2 + L \times dI/dt = V1 \times (n2/n1) \qquad \text{(Formula 2)}$$

The electric current during this period changes by the change ratio (dI/dt) that satisfies formula 2. Therefore, during this period, as long as the electric current flows in the direction indicated by the arrow shown in FIG. 2, the electric current increases by the change ratio (dI/dt) that satisfies formula 2. On the other hand, as long as the electric current flows in a direction opposite to the arrow shown in FIG. 2, the electric current decreases by the change ratio (dI/dt) that satisfies formula 2.

Formula 1 and formula 2 are satisfied both when the electric power is transmitted from the primary side to the secondary side and when the electric power is transmitted from the secondary side to the primary side. When it is desired to decrease a voltage of the secondary side or to increase a voltage of the primary side, the periods of T2, T4, that is, the time when both the switching element Q1 and the switching element Q2 turn ON (the time when all of the switching elements Qa-Qd turn OFF), should be longer.

In contrast, when it is desired to increase a voltage of the secondary side or to decrease a voltage of the primary side, the periods of T1, T3, that is, the time when either the switching element Q1 or the switching element Q2 turns ON (the time when the switching elements Qb, Qc turn ON, or the time when the switching elements Qa, Qd turn ON), should be longer.

A direction in which the current I flows is determined based on the relationship between V2 and V1×(n2/n1), that is, a voltage difference, and based on the relationship of the periods of T2, T4 and the periods of T1, T3, that is, the ratio of both periods=T1:T2 and T3:T4.

In the present invention, the voltages V1 and V2 can be adjusted by the same control regardless of the direction in which the current I flows. Therefore, switching from the powering state to the regeneration state or switching from the regeneration state to the powering state can be easily performed.

Figure 5:
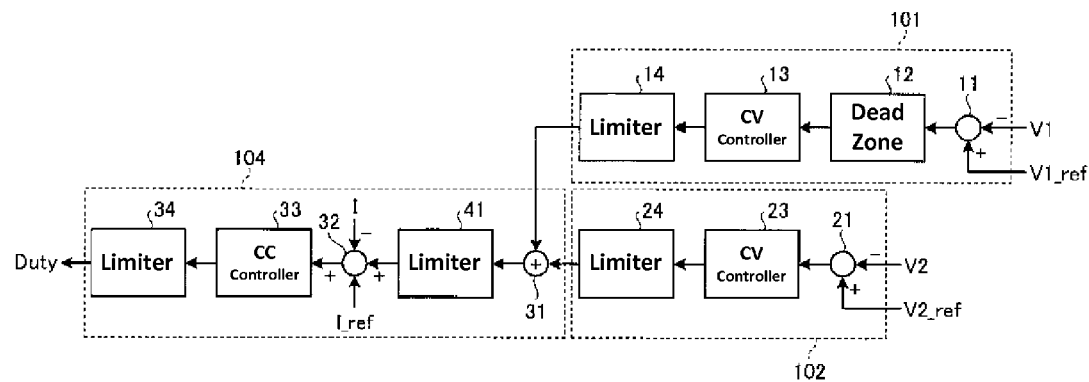
FIG. 5 is a block diagram of a controller that is applied to a DC-DC converter according to a second embodiment of the present invention.

FIG. 5 is a block diagram that shows a basic configuration of a control system that is applied to a DC-DC converter according to a second embodiment of the present invention.

In FIG. 5, a current control system 104 is provided instead of the current control system 103 shown in FIG. 3. A limiter 41 is provided at a former part of the adder-subtracter 32 in the current control system 104 (i.e., the limiter 41 is upstream of the adder-subtracter 32).

For power conversion from the primary side to the secondary side of the transformer 3, the values of the limiter 41 are configured as follows: Limiter 41: the lower limit=0, the upper limit=I_ref. Here, the positive value shows a current value that is output from the input and output terminals of the current-source power converter 2. The negative value shows the current value that flows into the input and output terminals of the current-source power converter 2.

For power conversion from the secondary side to the primary side of the transformer 3, the values of the limiter 41 is configured as follows:
Limiter 41: the lower limit=−I_ref, the upper limit=0 Here, by providing the limiter 41 at the former part of the adder-subtracter 32, an output value of the adder 31 can be limited to the range between 0 and I_ref. That is, the sum of the control input that results from the operation of the first voltage control system 101 and the control input that results from the operation of the second voltage control system 102 is limited to the range between 0 and I_ref.

Figure 6:
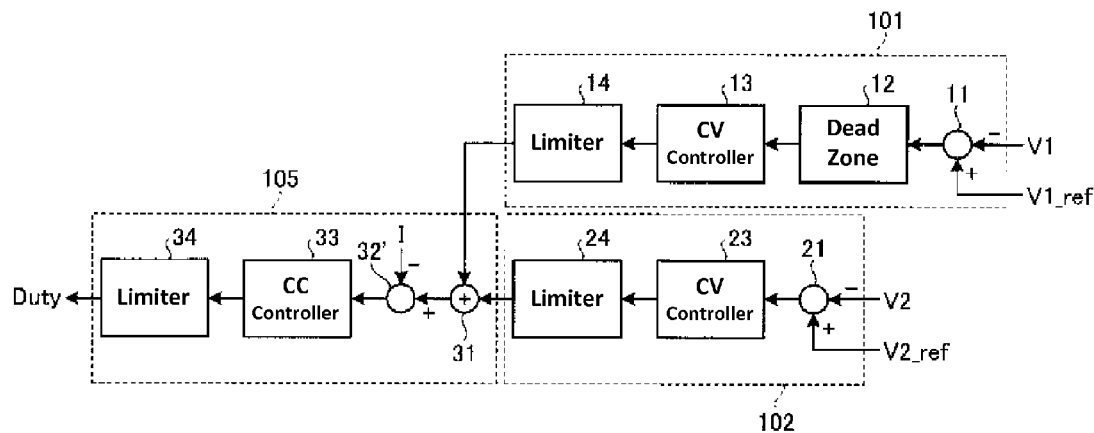
FIG. 6 is a block diagram of a controller that is applied to a DC-DC converter according to a third embodiment of the present invention.

FIG. 6 is a block diagram that shows a basic configuration of a control system that is applied to a DC-DC converter according to a third embodiment of the present invention.

In FIG. 6, a current control system 105 is provided instead of the current control system 103 shown in FIG. 3. In the current control system 105, a subtracter 32' is provided instead of the adder-subtracter 32. In the subtracter 32', the input of the target value I_ref is omitted and the detection value of the current I is subtracted from the output value of the adder 31.

In this control system, for power conversion from the primary side to the secondary side of the transformer 3, the values of the limiters 14, 24, 34 are configured as follows:
Limiter 14: the lower limit=−ΔI, the upper limit=ΔI;
Limiter 24: the lower limit=0, the upper limit=I_ref; and
Limiter 34: the lower limit=0, the upper limit=the greatest duty ratio.
Here, a positive value shows a current value which is output from the input and output terminals of the current-source power converter 2. A negative value shows the current value that flows into the input and output terminals of the current-source power converter 2. In this case, the range of the current I is between −ΔI and I_ref+ΔI. In the range between 0 and I_ref+ΔI, the current I becomes the electric current that is output from the input and output terminals of the current-source power converter 2. In the range between −ΔI and 0, the current I becomes the electric current that flows into the input and output terminals of the current-source power converter 2.

Further, for power conversion from the secondary side to the primary side of the transformer 3, the output values of the limiters 14, 24, 34 can be configured as follows:
Limiter 14: the lower limit=−I_ref, the upper limit=0;
Limiter 24: the lower limit=0, the upper limit=0; and
Limiter 34: the lower limit=0, the upper limit=the greatest duty ratio.
Here, in this case, the range of the current I is between −I_ref and 0. The current I becomes the electric current that flows into the input and output terminals of the current-source power converter 2.

Figure 7:
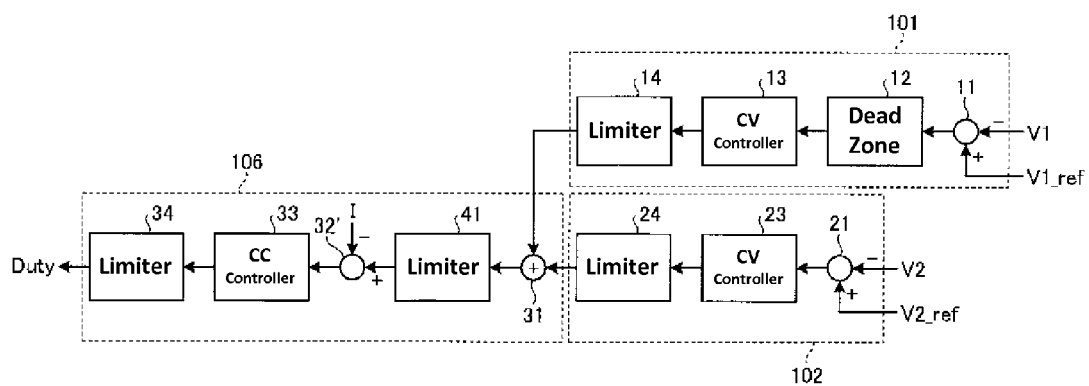
FIG. 7 is a block diagram of a controller that is applied to a DC-DC converter according to a fourth embodiment of the present invention.

FIG. 7 is a block diagram that shows a basic configuration of a control system which is applied to a DC-DC converter according to a fourth embodiment of the present invention.

In FIG. 7, a current control system 106 is provided instead of the current control system 105 shown in FIG. 6. In the current control system 106, a limiter 41 is provided on the former part of the subtracter 32' shown in the current control system 105.

For power conversion from the primary side to the secondary side of the transformer 3, the values of the limiters 14, 24, 34, 41 are configured as follows:
Limiter 14: the lower limit=−ΔI, the upper limit=ΔI;
Limiter 24: the lower limit=0, the upper limit=I_ref;
Limiter 34: the lower limit=0, the upper limit=the greatest duty ratio; and
Limiter 41: the lower limit=0, the upper limit=I_ref.
Here, in this case, the sum of the control input that results from the operation of the first voltage control system 101 and the control input that results from the operation of the second voltage control system 102 is limited to the range between 0 and I_ref.

Further, for power conversion from the secondary side to the primary side of the transformer 3, the output values of the limiters 14, 24, 34, 41 can be configured as follows:
Limiter 14: the minimum value=−I_ref, the greatest value=0;
Limiter 24: the minimum value=0, the greatest value=0;
Limiter 34: the minimum value=0, the greatest value=the greatest duty ratio; and
Limiter 41: the minimum value=−I_ref, the greatest value=0.
Here, in this case, the range of the current I is between −I_ref and 0. The current I becomes the electric current which flows into the input and output terminals of the current-source power converter 2.

Figure 8:
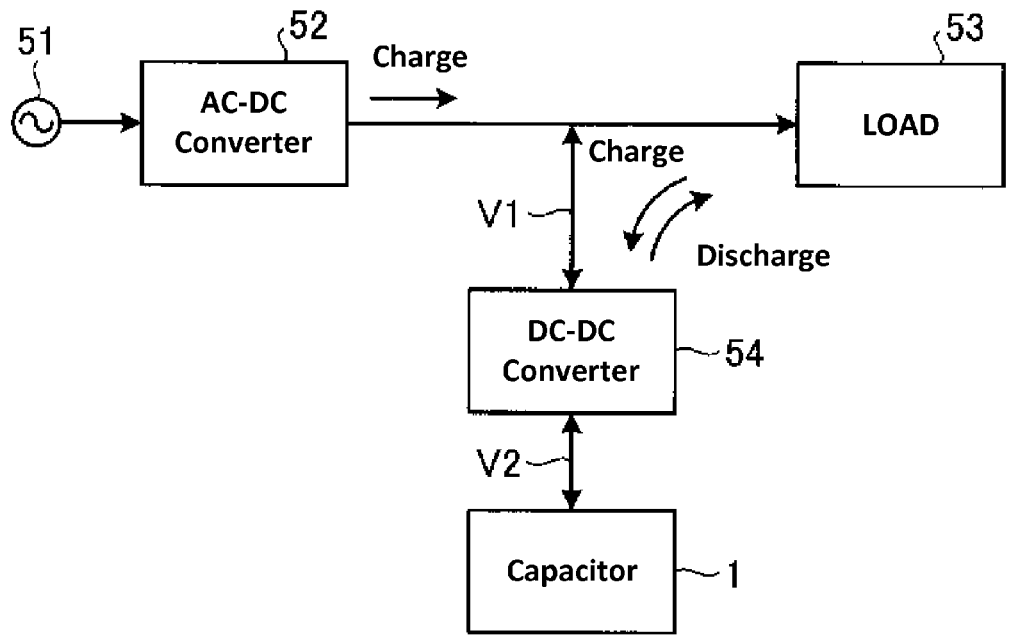
FIG. 8 is a block diagram of a power supply system in which a DC-DC converter shown in FIG. 1 is applied.

FIG. 8 is a block diagram of a power supply system in which a DC-DC converter shown in FIG. 1 is applied.

A load 53 is connected to an AC power source 51 through an AC-DC converter 52 as shown in FIG. 8. The load 53 can be, for example, electronic equipment that is operated by a direct current or a direct current motor. Further, the load 53 can be a solar battery or a power generator.

A capacitor (storage battery) 1 is connected to the load 53 through a DC-DC converter 54.

An alternating current that is output from the AC power source 51 is converted to a direct current by the AC-DC converter 52. The converted direct current is provided to the load 53.

Further, in case of accumulating the energy that is generated in the load 53 into the capacitor 1, the voltage V1 is converted to the voltage V2 by the DC-DC converter 54. Then, the capacitor 1 is charged by the voltage V2. On the other hand, in the case in which the AC power source 51 is blocked, the voltage V2 is converted to the voltage V1 by the DC-DC converter 54. Then, the converted electric power is provided to the load 53.

By using the configuration of the DC-DC converter shown in FIG. 1 as the DC-DC converter 54, the change of the voltage V1 can be controlled/prevented while charging. For example, when the voltage V2 decreases due to the decrease of the voltage V1, it is possible to increase the rail voltage V1 while the increase of the voltage V2 is prevented.

Figure 9:
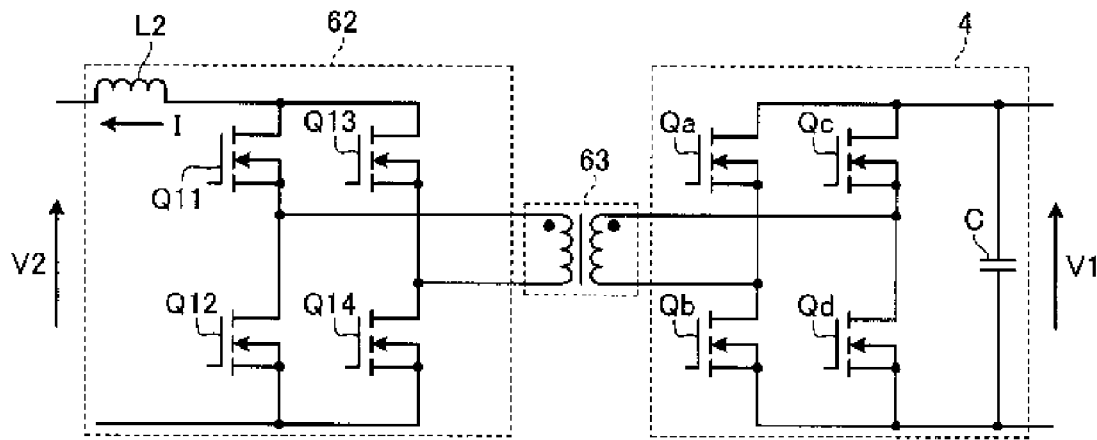
FIG. 9 is a circuit diagram of a current-source power converter 62 and a voltage-source power converter 4 that are applied to a DC-DC converter according to a fifth embodiment of the present invention.

FIG. 9 is a circuit diagram that shows a basic configuration of a current-style power converter 62 and the voltage-source power converter 4 that are applied to a DC-DC converter according to a fifth embodiment of the present invention. Further, a full bridge configuration is used as an example for the current-source power converter 62 in the embodiment shown in FIG. 9.

In FIG. 9, the current-source power converter 62 and the transformer 63 are provided instead of the current-source power converter 2 and the transformer 3 shown in FIG. 1. However, the other configurations are the same as the configurations shown in FIG. 1.

The current-source power converter 62 is configured with switching elements Q11-Q14 and an inductor L2. The switching elements Q11, Q12 are connected in series with each other and the switching elements Q13, Q14 are connected in series with each other. The series circuit of the switching elements Q11 and Q12 and the series circuit of the switching elements Q13 and Q14 are connected in parallel each other. A secondary winding of the transformer 63 is connected between a node connecting of the switching elements Q11 and Q12 and a node connecting of the switching elements Q13 and Q14. Further, the inductor L2 is connected to the node connecting of the switching elements Q11 and Q13.

Further, as the switching elements Q11-Q14, a field effect transistor, a bipolar transistor or an IGBT can be used. Further, in the switching elements Q11-Q14, a body diode can also be formed.

In the DC-DC converter, gates of the switching elements Q12, Q13 are driven by the gate driving signal S1 shown in FIG. 4 and gates of the switching elements Q11, Q14 are driven by the gate driving signal S2 shown in the FIG. 4. The other operations are the same as the operations of the DC-DC converter shown in FIG. 1.

Further, when the voltage V2 is low or when the range of change of the voltage V1 is narrow, it is efficient for the current-source power converter 2 that has the push-pull configuration shown in FIG. 2. In this current-source power converter 2 shown in FIG. 2, the current configuration can be simplified as compared with the current-source power converter 62 of the full-bridge configuration shown in FIG. 9.

On the other hand, when the voltage V2 is high or when the range of change of the voltage V1 is wide, the current-source power converter 62 that has the full bridge configuration shown in FIG. 9 is preferred because voltage stresses of the switching elements Q1, Q2 become large.

In the present embodiment, an input-output current of the input and output terminals of the current-source power converter 2 is detected. A controlled variable (control input) corresponding to the detected electric current is generated for controlling. However, the control can also be performed by detecting an input-output electric current of the input and output terminals of the voltage-source power converter 4 and by generating the controlled variable corresponding to the detected electric current. Further, it is possible that when the electric current is output from the input and output terminals of the current-source power converter 2, the control is performed by generating the controlled variable corresponding to the detected electric current by detecting the input-output electric current of the input and output terminals of the current-source power converter 2. It is also possible that when the electric current is output from the input and output terminals of the voltage-source power converter 4, the control is performed by generating the controlled variable corresponding to the detected electric current by detecting the input-output electric current of the input and output terminals of the voltage-source power converter 4.

The DC-DC converter and the method for controlling the DC-DC converter being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A DC-DC converter, comprising:
a transformer;
a voltage-source power converter that is provided at a primary side of the transformer;
a first voltage detection circuit that detects a first voltage between first input and output terminals of the voltage-source power converter;
a current-source power converter that is provided at a secondary side of the transformer;
a second voltage detection circuit that detects a second voltage between second input and output terminals of the current-source power converter;
a current detection circuit that detects an input-output current between the second input and output terminals of the current-source power converter; and
a controller that controls the voltage-source power converter and the current-source power converter to transfer power between the primary side and the secondary side of the transformer, wherein
the controller includes a first control unit that generates a first control input for the input-output current based on the first voltage, the first control unit has a first limiter having a first range and a first limit value, the first control unit outputs the first control input when the first control input is within the first range, and the first control unit outputs the first limit value when the first control input is outside the first range,
the controller includes a second control unit that generates a second control input for the input-output current based on the second voltage, the second control unit has a second limiter having a second range and a second limit value, the second control unit outputs the second control input when the second control input is within the second range, and the second control unit outputs the second limit value when the second control input is outside the second range,
the controller includes a third control unit that generates a command value based on the first and second control inputs, the first and second limit values, and the input-output current, and
the voltage-source power converter and the current-source power converter are controlled based on the command value.

2. The DC-DC converter according to claim 1, wherein the command value controls pulse width modulation (PWM) of the voltage-source power converter and the current-source power converter.

3. The DC-DC converter according to claim 1, wherein the command value controls pulse frequency modulation (PFM) of the voltage-source power converter and the current-source power converter.

4. A DC-DC converter, comprising:
a transformer;
a voltage-source power converter that is provided at a primary side of the transformer;
a first voltage detection circuit that detects a first voltage between first input and output terminals of the voltage-source power converter;

a current detection circuit that detects an input-output current between the first input and output terminals of the voltage-source power converter;
a current-source power converter that is provided at a secondary side of the transformer;
a second voltage detection circuit that detects a second voltage between second input and output terminals of the current-source power converter; and
a controller that controls the voltage-source power converter and the current-source power converter to transfer power between the primary side and the secondary side of the transformer, wherein
the controller includes a first control unit that generates a first control input for the input-output current based on the first voltage, the first control unit has a first limiter having a first range and a first limit value, the first control unit outputs the first control input when the first control input is within the first range, and the first control unit outputs the first limit value when the first control input is outside the first range,
the controller includes a second control unit that generates a second control input for the input-output current based on the second voltage, the second control unit has a second limiter having a second range and a second limit value, the second control unit outputs the second control input when the second control input is within the second range, and the second control unit outputs the second limit value when the second control input is outside the second range,
the controller includes a third control unit that generates a command value based on the first and second control inputs and the input-output current, and
the voltage-source power converter and the current-source power converter are controlled based on the command value and the first and second limit values.

5. The DC-DC converter according to claim 4, wherein the command value controls pulse width modulation (PWM) of the voltage-source power converter and the current-source power converter.

6. The DC-DC converter according to claim 4, wherein the command value controls pulse frequency modulation (PFM) of the voltage-source power converter and the current-source power converter.

7. A DC-DC converter, comprising:
a transformer;
a voltage-source power converter that is provided at a primary side of the transformer;
a first voltage detection circuit that detects a first voltage between first input and output terminals of the voltage-source power converter;
a current-source power converter that is provided at a secondary side of the transformer;
a second voltage detection circuit that detects a second voltage between second input and output terminals of the current-source power converter;
a current detection circuit that detects an input-output current between the second input and output terminals of the current-source power converter; and
a controller that controls the voltage-source power converter and the current-source power converter to transfer power between the primary side and the secondary side of the transformer, wherein
the controller includes a first control mode that controls a first current value of an output current outputting from the second input and output terminals of the current-source power converter so as to be brought close to a first target value, and a second control mode that controls a second current value of an input current flowing in the second input and output terminals of the current-source power converter so as to be brought close to a second target value,
the controller includes first and second limiters having first and second ranges and first and second limit values, respectively,
when the first and second current values are within the first and second range, the first and second current values are the output and input currents, respectively,
when the first and second current values are outside the first and second range, the first and second limit values are the output and input currents, respectively,
when power is transferred from the primary side to the secondary side of the transformer, a first power conversion is performed under the first control mode, and
when power is transferred from the secondary side to the primary side of the transformer, a second power conversion is performed under the second control mode.

8. A DC-DC converter, comprising:
a transformer;
a voltage-source power converter that is provided at a primary side of the transformer;
a first voltage detection circuit that detects a first voltage between first input and output terminals of the voltage-source power converter;
a current detection circuit that detects an input-output current between the first input and output terminals of the voltage-source power converter;
a current-source power converter that is provided at a secondary side of the transformer;
a second voltage detection circuit that detects a second voltage between second input and output terminals of the current-source power converter; and
a controller that controls the voltage-source power converter and the current-source power converter to transfer power between the primary side and the secondary side of the transformer, wherein
the controller includes a first control mode that controls a first current value of an output current outputting from the first input and output terminals of the voltage-source power converter so as to be brought close to a first target value, and a second control mode that controls a second current value of an input current flowing in the first input and output terminals of the voltage-source power converter so as to be brought close to a second target value,
the controller includes first and second limiters having first and second ranges and first and second limit values, respectively,
when the first and second current values are within the first and second range, the first and second current values are the output and input currents, respectively,
when the first and second current values are outside the first and second range, the first and second limit values are the output and input currents, respectively,
when power is transferred from the secondary side to the primary side of the transformer, a first power conversion is performed under the first control mode, and
when power is transferred from the primary side to the secondary side of the transformer, a second power conversion is performed under the second control mode.

9. A method for controlling a DC-DC converter including a voltage-source power converter provided at a primary side of a transformer and a current-source power converter provided at a secondary side of the transformer so as to transfer power between the primary side and the secondary side of the transformer, the method comprising:

generating one of a first control input and a first limit value based on a first voltage between first input and output terminals of the voltage-source power converter by a controller, the controller having a first range and the first limit value, the first control input being generated when the first control input is within the first range, the first limit value being generated when the first control input is within the first range;

generating one of a second control input and a second limit value based on a second voltage between second input and output terminals of the current-source power converter by the controller, the controller having a second range and the second limit value, the second control input being generated when the second control input is within the second range, the second limit value being generated when the second control input is within the second range;

generating a command value based on the first and second control inputs, the first and second limit values, and an input-output current between the second input and output terminals of the current-source power converter; and controlling the voltage-source power converter and the current-source power converter based on the command value, wherein the first and second control inputs control the input-output current between the second input and output terminals of the current-source power converter.

10. The method for controlling a DC-DC converter according to claim 9, wherein
the command value controls pulse width modulation (PWM) of the voltage-source power converter and the current-source power converter.

11. The method for controlling a DC-DC converter according to claim 9, wherein
the command value controls pulse frequency modulation (PFM) of the voltage-source power converter and the current-source power converter.

12. A method for controlling a DC-DC converter including a voltage-source power converter provided at a primary side of a transformer and a current-source power converter provided at a secondary side of the transformer so as to transfer power between the primary side and the secondary side of the transformer, the method comprising:

generating one of a first control input and a first limit value based on a first voltage between first input and output terminals of the voltage-source power converter by a controller, the controller having a first range and the first limit value, the first control input being generated when the first control input is within the first range, the first limit value being generated when the first control input is within the first range;

generating one of a second control input and a second limit value based on a second voltage between second input and output terminals of the current-source power converter by the controller, the controller having a second range and the second limit value, the second control input being generated when the second control input is within the second range, the second limit value being generated when the second control input is within the second range;

generating a command value based on the first and second control inputs, the first and second limit values, and an input-output current between the first input and output terminals of the voltage-source power converter; and controlling the voltage-source power converter and the current-source power converter based on the command value, wherein the first and second control inputs control the input-output current between the first input and output terminals of the voltage-source power converter.

13. The method for controlling a DC-DC converter according to claim 12, wherein
the command value controls pulse width modulation (PWM) of the voltage-source power converter and the current-source power converter.

14. The method for controlling a DC-DC converter according to claim 12, wherein
the command value controls pulse frequency modulation (PFM) of the voltage-source power converter and the current-source power converter.

15. A DC-DC converter, comprising:
a transformer;
a voltage-source power converter that is provided at a primary side of the transformer and that performs power conversion by controlling a first voltage applied to the primary side of the transformer;
a current-source power converter that is provided at a secondary side of the transformer, that include a switch and an inductor, and that performs the power conversion by controlling a first current flowing in the secondary side of the transformer; and
a controller that controls the voltage-source power converter and the current-source power converter based on a first voltage value of a second voltage generated between first input and output terminals of the voltage-source power converter, a second voltage value of a third voltage generated between second input and output terminals of the current-source power converter, and a first current value of an input-output current flowing between one of the first input and output terminals of the voltage-source power converter and the second input and output terminals of the current-source power converter, wherein
when the switch of the current-source power converter is turned on, a flux of the transformer is canceled out inside a core, and
a period for charging the inductor is included in a period of a switching operation.

16. The DC-DC converter according to claim 15, wherein
the controller includes a first control unit that generates a first control input for the input-output current based on the second voltage, a second control unit that generates a second control input for the input-output current based on the third voltage, and a third control unit that generates a command value based on the first and second control inputs and the input-output current, and
the voltage-source power converter and the current-source power converter are controlled based on the command value.

17. The DC-DC converter according to claim 15, wherein
the controller includes a first control mode that controls a second current value of an output current output from either of the first input and output terminals of the voltage-source power converter or the second input and output terminals of the current-source power converter so as to be brought close to a first target value, and a second control mode that controls the first current value of the input-output current flowing in either of the first input and output terminals of the voltage-source power converter or the second input and output terminals of the current-source power converter so as to be brought close to a second target value, when power is transferred from the primary side to the secondary side of the transformer, the power conversion is performed by the first control mode, and when power is transferred from the secondary side to the primary side of the transformer, the power conversion is performed by the second control mode.

18. The DC-DC converter according to claim 15, wherein the current-source power converter includes:
   the inductor connected to a center tap of a secondary winding of the transformer,
   a first switching element connected between an end of the secondary winding and a negative pole of the second input and output terminals of the current-source power converter, and
   a second switching element connected between another end of the secondary winding and the negative pole.

19. The DC-DC converter according to claim 18, wherein the controller includes:
   a first control unit that generates a first control input for the input-output current based on the second voltage,
   a second control unit that generates a second control input for the input-output current based on the third voltage, and
   a third control unit that generates a command value based on the first and second control inputs and the input-output current, and
   the voltage-source power converter and the current-source power converter are controlled based on the command value.

20. The DC-DC converter according to claim 19, wherein the third control unit generates the command value for pulse width modulation (PWM) control of the voltage-source power converter and the current-source power converter based on the first current value flowing in the current-source power converter.

21. The DC-DC converter according to claim 19, wherein the third control unit generates the command value for pulse frequency modulation (PFM) control of the voltage-source power converter and the current-source power converter based on the first current value flowing in the current-source power converter.

22. The DC-DC converter according to claim 19, wherein the third control unit generates the command value for pulse width modulation (PWM) control of the voltage-source power converter and the current-source power converter based on the first current value flowing in the voltage-source power converter.

23. The DC-DC converter according to claim 19, wherein the third control unit generates the command value for pulse frequency modulation (PFM) control of the voltage-source power converter and the current-source power converter based on the first current value flowing in the voltage-source power converter.

24. The DC-DC converter according to claim 19, wherein the first control input is within a first predetermined range, and
   the second control input is within a second predetermined range.

25. A method for controlling a DC-DC converter including a voltage-source power converter provided at a primary side of a transformer and a current-source power converter provided at a secondary side of the transformer so as to transfer power between the primary side and the secondary side of the transformer, the method comprising:
   generating one of a first control input and a first limit value based on a first voltage between first input and output terminals of the voltage-source power converter by a controller, the controller having a first range and the first limit value, the first control input being generated when the first control input is within the first range, the first limit value being generated when the first control input is within the first range;
   generating one of a second control and a second limit value input based on a second voltage between second input and output terminals of the current-source power converter by the controller, the controller having a second range and the second limit value, the second control input being generated when the second control input is within the second range, the second limit value being generated when the second control input is within the second range;
   generating a command value based on the first and second control inputs, the first and second limit values, and a first current value of an input-output current flowing between one of the first input and output terminals of the voltage-source power converter and the second input and output terminals of the current-source power converter; and
   controlling switching operations of the voltage-source power converter and the current-source power converter based on the command value, wherein
   the controlling changes the first current value of the input-output current.

* * * * *